United States Patent
DiMambro

(10) Patent No.: US 7,379,453 B1
(45) Date of Patent: *May 27, 2008

(54) METHOD AND APPARATUS FOR TRANSFERRING MULTIPLE PACKETS FROM HARDWARE

(75) Inventor: Francesco R. DiMambro, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 10/812,255

(22) Filed: Mar. 29, 2004

(51) Int. Cl.
*H04L 12/50* (2006.01)

(52) U.S. Cl. .................... 370/363; 711/167

(58) Field of Classification Search ............. 370/363, 370/395, 286, 389, 256, 412, 475, 429; 709/221, 709/238
See application file for complete search history.

(56) References Cited

U.S. PATENT DOCUMENTS

| | | | |
|---|---|---|---|
| 5,361,261 A * | 11/1994 | Edem et al. ............. 370/445 |
| 5,485,579 A * | 1/1996 | Hitz et al. ............... 709/221 |
| 5,487,152 A * | 1/1996 | Young .................... 709/236 |
| 5,828,903 A * | 10/1998 | Sethuram et al. ......... 710/53 |
| 6,111,858 A * | 8/2000 | Greaves et al. .......... 370/256 |
| 6,263,396 B1 * | 7/2001 | Cottle et al. ............ 710/263 |
| 6,480,489 B1 * | 11/2002 | Muller et al. ........... 370/389 |
| 6,680,933 B1 * | 1/2004 | Cheesman et al. ........ 370/352 |
| 6,697,984 B1 * | 2/2004 | Sim et al. ............... 714/751 |
| 6,751,665 B2 * | 6/2004 | Philbrick et al. ......... 709/224 |
| 6,760,333 B1 * | 7/2004 | Moody et al. ........... 370/395.1 |
| 6,850,542 B2 * | 2/2005 | Tzeng .................... 370/475 |
| 6,912,209 B1 * | 6/2005 | Thi et al. ............... 370/286 |
| 7,010,607 B1 * | 3/2006 | Bunton .................. 709/228 |
| 7,046,686 B1 * | 5/2006 | Tompkins et al. ........ 370/412 |
| 2002/0026502 A1 * | 2/2002 | Phillips et al. ........... 709/219 |
| 2003/0012214 A1 * | 1/2003 | Munter ................... 370/429 |
| 2004/0218606 A1 * | 11/2004 | Leatherbury et al. .... 370/395.5 |
| 2005/0204058 A1 * | 9/2005 | Philbrick et al. ......... 709/238 |
| 2005/0240745 A1 * | 10/2005 | Iyer et al. ............... 711/167 |

* cited by examiner

*Primary Examiner*—Thong Vu
(74) *Attorney, Agent, or Firm*—Park, Vaughan & Fleming LLP

(57) ABSTRACT

A method and apparatus for facilitating transfer of packets from communication hardware to a host computing device or software. After receiving s set of packets at a communication interface, the system writes in a hybrid buffer a type II completion line configured to identify a payload buffer in which payloads of packets are stored. For each packet, the system writes a type I completion line configured to indicate the length of a packet's header in the hybrid buffer and the length and/or offset of the packet's payload in the payload buffer. A type 0 completion line indicates that no more packets are stored in the payload buffer. The system then signals the host computing device by configuring a single completion descriptor to identify the hybrid buffer in which the completion lines are stored. The host computing device reads the single completion descriptor to process the packets.

24 Claims, 3 Drawing Sheets

METHOD AND APPARATUS FOR TRANSFERRING MULTIPLE PACKETS FROM HARDWARE

BACKGROUND

This invention relates to the field of computer systems. More particularly, a method and apparatus are provided for transferring multiple packets from hardware to software.

Traditionally, packets are forwarded from the hardware that receives them, such as a network interface or channel adapter, to a host computing device with the assistance of descriptors. For each packet, one or more completion descriptors are configured to describe the packet (e.g., storage location, size, type) so that the host device could retrieve and process it. Thus, for each packet received at the hardware, the host device would receive an interrupt from the hardware, read the associated descriptor(s), then go and retrieve the packet for further processing before turning to the next one.

However, communication rates have increased exponentially in recent history, and have out-paced increases in processor speed. As a result, it is becoming more and more difficult, if not impossible, for a host device to keep up with incoming packets. Part of the problem is the amount of processor time that is needed to consume a completion descriptor for each packet.

Methods have been developed for interrupt blanking or coalescing, in which a single interrupt may be signaled for multiple packets being transferred from hardware to software. However, even with these methods, the host computing device still must process a separate completion descriptor for each packet.

Therefore, there is a need for a method and apparatus for describing or forwarding multiple packets to a host device using a single descriptor and/or for simplifying the form of such a descriptor so that they can be processed faster.

SUMMARY

In one embodiment of the invention, a method and apparatus are provided for facilitating the efficient transfer of packets from communication hardware (e.g., a network interface circuit) to a host computing device or software executing on the device (e.g., a device driver). In this embodiment, completion lines are used to describe how and where packets are stored in memory during the transfer.

If header splitting is enabled, headers of packets larger than a threshold size are packed in a hybrid buffer, while payloads are stored in payload buffers. Without header splitting, a packet larger than the threshold size is stored in a payload buffer; a packet smaller than the threshold size is stored in the hybrid buffer.

For each packet, one or more completion lines are written in a hybrid buffer. A first type of completion line, a payload completion line, identifies the payload buffer in which payloads of one or more subsequent packets are stored. Each time a packet payload is stored in a different payload buffer than the preceding packet's payload, a new packet completion line is written.

Another, per-packet, type of completion line indicates the length of a packet's header in the hybrid buffer and the length and/or offset of the packet's payload in a payload buffer. A null completion line indicates that no more completion lines or packet headers are stored in the buffer.

Thus, in this embodiment of the invention, state information regarding a set of packets is maintained in a compact memory region, rather than in scattered individual descriptors for each packet. As one benefit of the use of completion lines and compacted state information, the cost of accessing per-packet information is significantly reduced.

To signal the transfer of a set of packets, the hardware configures a single completion descriptor to identify the hybrid buffer in which the packets' corresponding per-packet completion lines are stored. In one embodiment, no other information needs to be included in the descriptor. The completion descriptor may be released to software by modifying an ownership indicator, signaling an interrupt, or via other means.

In response to notification from the hardware, the software accesses the specified hybrid buffer and begins reading completion lines and accessing the corresponding packet headers and payloads. It stops processing when it reaches a null completion line. The software may maintain status information for any number of hybrid buffers, to identify where it stopped reading during its last access (i.e., the location of the null completion line).

Illustratively, during each subsequent use of a hybrid buffer, the hardware may overwrite the null completion line with the next payload or per-packet completion line. Thus, on the software's next access of the hybrid buffer, it can resume reading at the appropriate position.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method and apparatus are provided for efficiently transferring multiple packets from hardware (e.g., a network interface circuit) to software (e.g., a device driver) operating on a host computing device. In this embodiment, a completion descriptor is configured with minimal information—such as just enough information to identify the memory buffer in which the packets or information further describing the packets may be found.

In one implementation, the buffer stores a set of "completion lines" that allow the software to locate the individual packets. Header splitting is supported. Each completion line may identify a header and/or payload location, and may include other information (e.g., checksum, checksum type, identity of a payload buffer). Thus, in this implementation, instead of storing information describing a packet in a completion descriptor, such information may be stored in the same buffer in which the packet (e.g., header and/or payload) is stored. Other embodiments of the invention may be derived from the embodiments described herein without exceeding the scope of the present invention.

Figure 1:
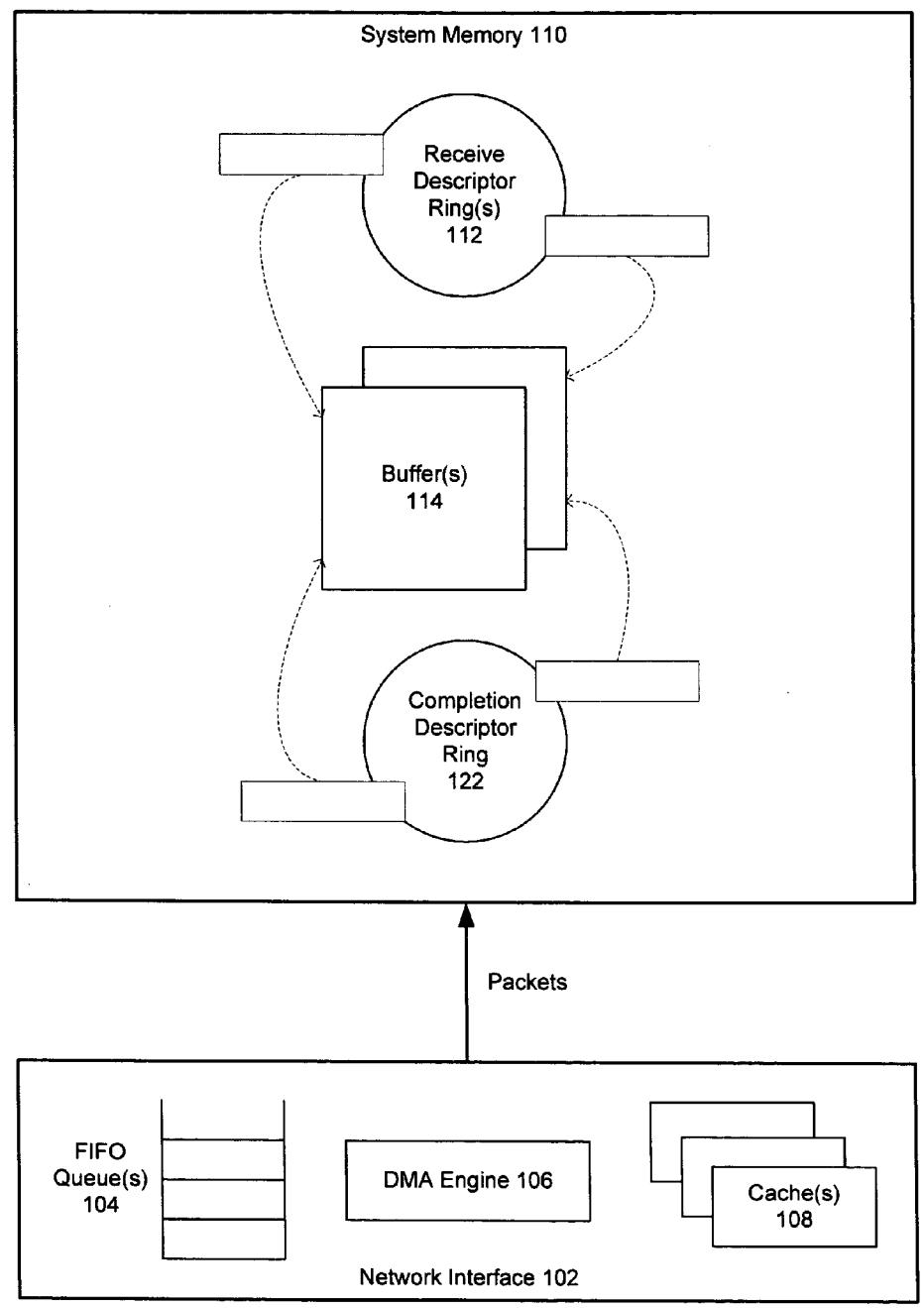
FIG. 1 is a block diagram depicting an environment in which an embodiment of the present invention may be implemented.

FIG. 1 demonstrates a computing and communication environment in which an embodiment of the invention may be implemented. In this environment, a computer system or computing device includes network or communication interface 102 and system memory 110.

Network interface 102 may comprise a network interface circuit, a channel adapter or other type of communication interface for receiving packetized communications from a dedicated or shared communication link, which may be wired or wireless. System memory 110 includes memory in which the network interface stores packets or other communications (e.g., cells, frames), for consumption by the network interface's device driver and/or other software (e.g., a protocol stack). System memory may be of any type (e.g., SRAM, DRAM).

Network interface 102 includes one or more queues 104 for storing packets received from a communication link (prior to transfer to system memory 110), DMA engine 106 for transferring the packets, and one or more caches 108 for storing state information and/or other data used during packet transfers.

For example, if DMA engine 106 is configured to transfer data in sets of cache lines, cache 108 may store a set of cache lines until it is full. Therefore, if the portion of system memory corresponding to the cache line is filled in piecemeal fashion, the previously written contents are readily available, and subsequent DMA transfers will not wipe out what was written previously. Thus, the overhead of performing read-modify-write operations can be avoided.

System memory 110 includes receive descriptor ring(s) 112, completion descriptor ring(s) 122 and any number of buffers 114 for storing packets transferred from hardware. A receive descriptor ring 112 is populated with descriptors that are configured to describe, to the network interface, individual buffers 114 in which to store packets. When the network interface needs a new buffer, a receive descriptor is retrieved via a receive descriptor ring. Illustratively, each new receive descriptor specifies an index into a table of buffers. The network interface reads the location of a buffer from the specified index of a receive descriptor and uses the corresponding buffer to store one or more packets.

In one embodiment of the invention, a completion descriptor is used by the network interface to inform software (e.g., its device driver) that one or more packets have been written to a buffer 114 in system memory 110. The completion descriptor is configured by the network interface when a packet is stored, and may include just the identity (e.g., index, address) of the packet's buffer, but may include other information in other embodiments of the invention. When the completion descriptor is released to the software (e.g., by changing an ownership indicator, by signaling an interrupt), the software identifies and accesses the specified buffer and retrieves the packet.

Network interface 102 may configure a single completion descriptor to notify software of the transfer of any number of packets. When the software accesses the buffer, it will retrieve all available packets.

In one embodiment of the invention, different receive and/or completion descriptor rings may be used for different communication flows or for communications distinguished on the basis of other criteria (e.g., protocol, type of checksum). In addition, any number of system memory buffers may be active at the same time. The particular buffer in which a packet is stored may depend on various factors (e.g., whether header splitting is enabled, which communication flow the packet was received in, the size of the packet, whether the packet is a control packet). A high-speed network interface and a method of operating the interface are described in U.S. Pat. No. 6,453,360, which issued on Sep. 17, 2002 and is hereby incorporated by reference.

Figure 2A:
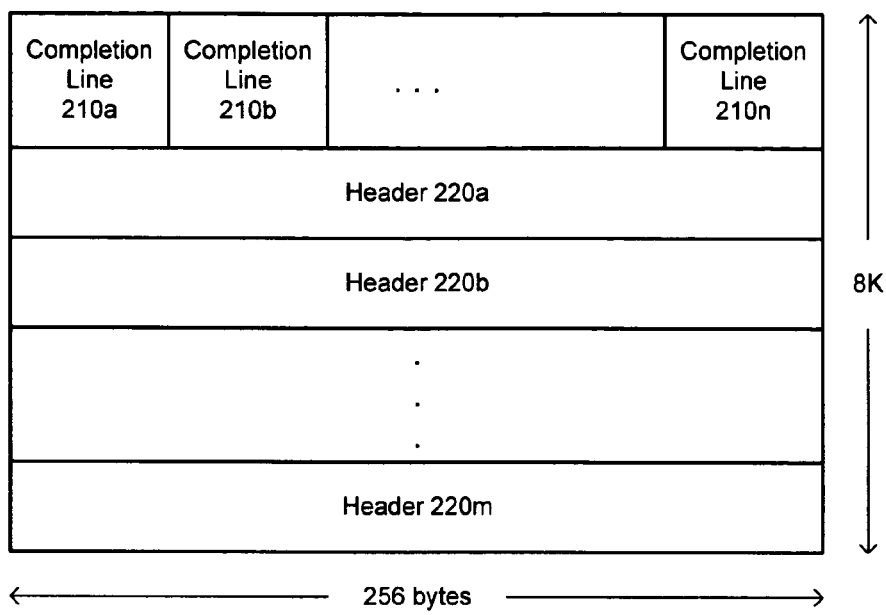
FIG. 2 is a block diagram of a buffer for describing multiple packets being transferred from hardware to software, according to one embodiment of the invention.

FIG. 2A describes an illustrative buffer for facilitating the transfer of multiple packets to software, according to one embodiment of the invention. In this embodiment, memory page size is 8 KB; other embodiments of the invention may be derived from the following discussion for other page sizes.

In this embodiment, memory buffers in which a network interface (or other communication interface) stores packets are of one memory page in size. One particular type of memory buffer, such as hybrid buffer 202, is configured to store headers of packets (if header splitting is enabled) and/or small packets (e.g., less than or equal to 256 bytes in length). If header splitting is enabled, then the header of a packet may be stored in hybrid buffer 202 while its payload is stored in a different buffer.

As described above, different hybrid (and other) buffers may be employed for different TCP (Transport Control Protocol) flows or other communication streams. This may facilitate the reassembly of related packets.

Hybrid buffer 202 includes multiple (e.g., 32) 256 byte entries. A first entry is used to store completion lines 210, while individual headers 220 are stored in the other entries.

Each completion line 210 is approximately 64 bytes long and describes one packet. Thus, 32 completion lines may be stored in one entry of the buffer. Each completion line is configured to identify the storage location of its associated packet. If header splitting is active, the completion line will identify the storage locations of the packet's header and its payload.

The header of a packet described by a completion line may or may not be stored in the same buffer. However, in one implementation of the embodiment of the invention depicted in FIG. 2A, the headers of packets described by completion lines 210 in hybrid buffer 202 are also stored in hybrid buffer 202, while the packets' payloads are stored in one or more separate payload buffers. Thus, the payload buffers may be configured to facilitate packet reassembly. In particular, the packet's payloads may be packed contiguously into the payload buffers.

In another illustrative embodiment of the invention, in which memory page size is 16 KB, a hybrid buffer may remain logically segmented into 256-byte entries or portions. In this embodiment, two entries may be reserved for completion lines.

Any number of types of completion lines may be defined. In one embodiment of the invention, depicted in FIG. 2B, three types of completion lines are employed—Type 0, Type I and Type II. In addition, multiple variants of a particular type may be defined, such as Type IIA and Type IIB.

Figure 2B:
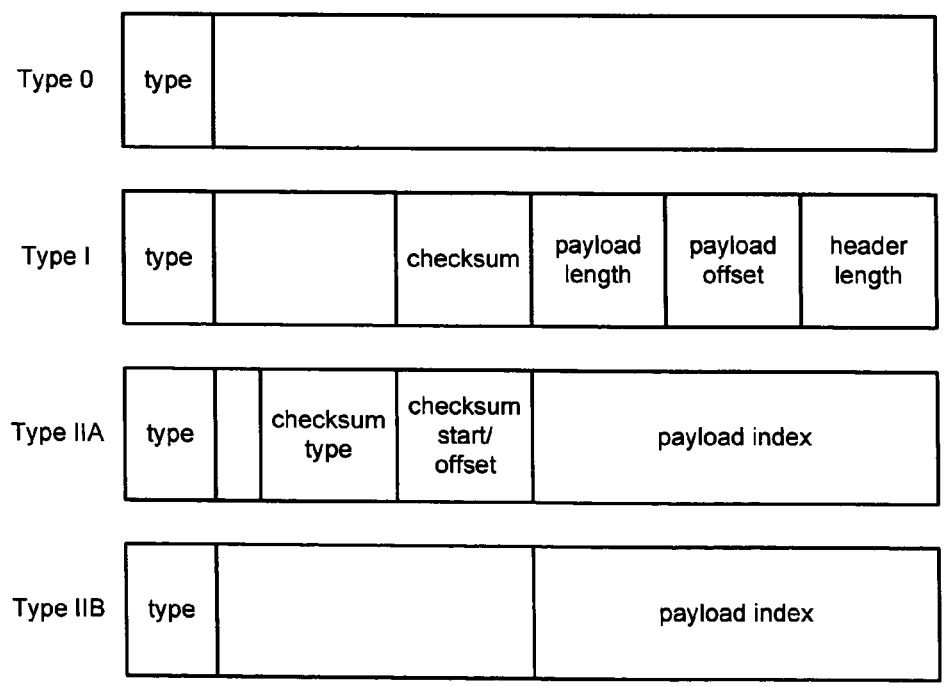

Each completion line includes a type field for indicating to software the completion line's type. In FIG. 2B, Type 0 completion lines may be considered null completion lines, and are used to signal software that no more packets are currently stored. Thus, when software is consuming completion lines and retrieving their associated packets, a completion line of Type 0 tells the software that it can stop (e.g., until signaled that another set of packets is ready).

Type II completion lines are used to identify a payload buffer in which payloads of packets (and/or entire packets) may be stored. Thus, each Type II completion line includes an address or index (into a table) of a payload buffer. Type IIA completion lines also include a checksum type field and a checksum start field, and may include other information common to a set of packets (e.g., flow identifier, virtual channel).

Illustratively, after a Type IIA completion line is encountered, all subsequent packet payloads will be found in the same payload buffer (with the same checksum type and start). When that payload buffer is filled, a Type IIB completion line may be used to identify the next payload buffer. A new Type IIA completion line may be used for the same purpose and/or when other common information changes (e.g., a checksum type).

Type I completion lines are used for each packet. A Type I completion line includes the length of the header of its associated packet, and may also identify the buffer in which the header is stored (if different from the buffer in which the completion line is stored). Illustratively, headers are stored consecutively in a buffer, and their completion lines are also stored consecutively in one entry of the same buffer. Therefore, all the software needs to know in order to find a next header is the sizes of all headers that it previously processed in that buffer (or the number of headers if they are all of fixed size).

Type I completion lines also identify the length and offset of the associated packet's payload, in the payload buffer identified by the most recent Type II completion line. Yet further, Type I completion lines may include other information useful for processing a particular packet (e.g., a checksum).

In the illustrated embodiment of the invention, if a packet or packet payload is stored across two or more buffers, its corresponding Type I completion line will be followed by one or more Type II completion lines indicating the other buffer(s) in which the rest of the packet or payload is stored.

Figure 3:
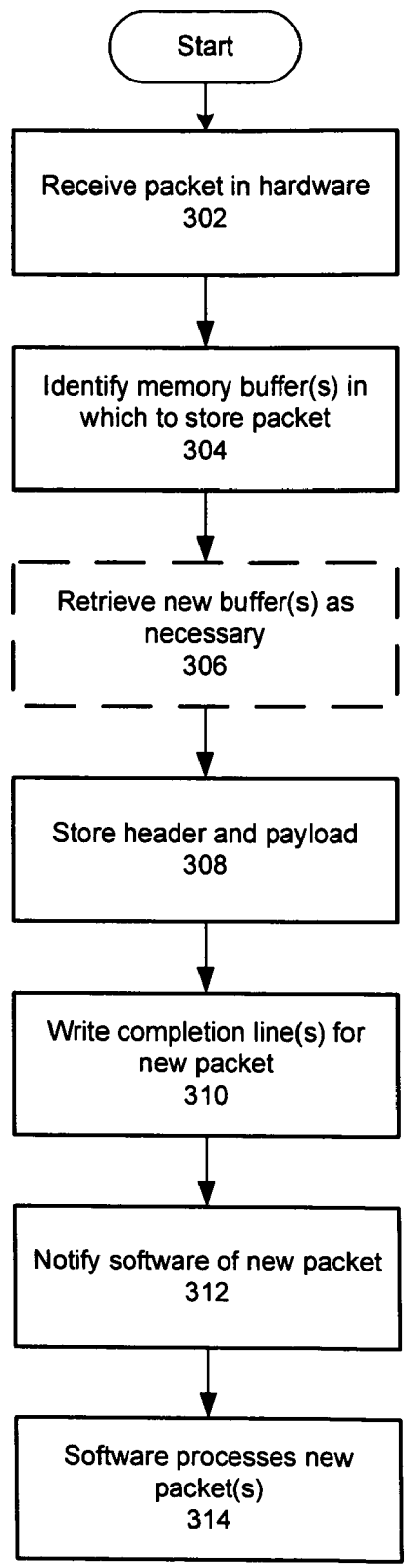
FIG. 3 is a flowchart illustrating one method of transferring multiple packets from hardware, according to one embodiment of the invention.

FIG. 3 describes a method of efficiently transferring and describing packets from hardware to software, according to one embodiment of the invention. This embodiment is not limited in how memory buffers (for storing packets) are identified or made available to the hardware, or in how a particular buffer is selected for storing a particular packet (or header or payload). The illustrated embodiment employs the types of completion lines described in FIG. 2B.

In operation 302, a network interface or other communication hardware receives one or more packets from a communication link (e.g., a network). The packets may be part of the same communication flow or may be from different communication streams or connections. Although the illustrated method is described as it may be implemented for processing multiple packets at a time, the method is equally useful when a single packet is received.

Any amount of initial processing may be performed on the packets in the hardware. For example, a layer one header may be stripped, the packets' communication flow(s) and/or other aspects of the packets may be identified, etc.

In operation 304, the hardware identifies or selects a buffer or set of buffers in which to store the packets. This operation may depend on whether header splitting or reassembly is enabled, and/or other factors (e.g., whether they are from the same communication connection). If necessary, in operation 306 additional buffers may be obtained from the host computing device.

In operation 308, the packets are stored. If header splitting is enabled and packet reassembly is supported, then the headers and payloads may be stored in separate buffers. In particular, the headers may be packed into header or hybrid buffers configured to store headers (and/or small packets), while the payloads are reassembled in separate payload buffers.

Illustratively, the header of the first packet in the set of packets is stored immediately after the last header stored in the selected header or hybrid buffer. Or, a new header buffer or hybrid buffer may be started. In this case, the first entry (or some other predetermined entry) in the new buffer is reserved for completion lines and the first header is stored in the first header position. Headers of each subsequent packet are stored consecutively. Similarly, the payloads of the packets may be stored consecutively in the selected payload buffer(s).

In operation 310, one or more completion lines are written for each packet. In this embodiment, each Type I completion line is stored in the same (hybrid) buffer as the header of its associated packet.

More particularly, the first completion line for the set of packets will be a Type II completion line if the payload of the first packet was stored in a new payload buffer. Then, for each subsequent packet, a corresponding Type I completion line will identify the payload's offset and/or length in its buffer, as well as the length of its header. When a new payload buffer is started, a new Type II completion line is written to identify that buffer.

After the packets are stored and the necessary Type I and Type II completion lines are written, a Type 0 completion line is written (assuming no more packets are ready to be stored in the same buffer(s)).

In the presently described embodiment of the invention, the hardware may maintain a cache to temporarily store a cache line or set of cache lines (depending on the allowed size of a DMA transfer) until that set is completely used and written.

In operation 312, the hardware notifies the software that a set of packets is ready to be processed. Illustratively, this notification is performed by configuring a completion descriptor to identify the buffer(s) in which the completion lines were stored. In this embodiment, no other information regarding the packets needs to be included in the completion descriptor, and only a single completion descriptor is needed, regardless of the number of packets. The completion descriptor may be released to software by changing an ownership bit, signaling an interrupt, or in some other manner.

In operation 314, the software reads the completion descriptor and accesses the identified buffer(s). In one embodiment of the invention, the software may read the entire buffer and then parse through the completion lines. As it reads each Type I completion line, it may retrieve the associated header and/or payload and commence processing them through the corresponding protocol stack. Each time a Type II completion line is read, the software accesses the specified new payload buffer. When a Type 0 completion line is reached, the software stops.

The software may maintain state information regarding the buffers it has not completely consumed. For example, the state information may indicate the last (or next) completion line and/or header location to be read from a buffer (when a completion descriptor is received that identifies the buffer).

Illustratively, the next time the hardware writes a completion line to a buffer in which it wrote a Type 0 completion line, the hardware may overwrite the Type 0 completion line with a Type I or Type II completion line. Because the software may maintain state information identifying how much of that buffer it has already consumed, it will resume reading or parsing from where the Type 0 completion line was.

In one embodiment of the invention, a completion descriptor need not be a descriptor in a ring. It may be part of an array, list or other structure, and may use ownership indicators (e.g., bits), head/tail pointers into the structure or other mechanisms to avoid overlap. This may help prevent the danger of hardware overwriting a descriptor that the software has not yet consumed.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of transferring packets from communication hardware to a host computing device, the method comprising:
   receiving a set of packets at a communication interface;
   in a hybrid buffer of a host computing device, writing a first type II completion line configured to identify a first payload buffer in which payloads of a first subset of the packets are stored, wherein the type II completion line includes an address or index of a payload buffer and other information common to the set of packets;
   for each packet in the set of packets, writing a corresponding per-packet type I completion line in the hybrid buffer, wherein the type I completion line includes information about a length of the packet, a length and a storage location of a header for the packet, and other information useful for processing the packet;
   after writing said per-packet type I completion lines, writing a type 0 completion line, wherein a type 0 completion line indicates that no more packets are currently stored following the address or index indicated in the type II completion line;
   signaling the host computing device that a set of packets is ready to be processed by configuring a single completion descriptor to identify the hybrid buffer in which the completion lines were stored; and
   at the host computing device, reading the single completion descriptor and accessing the identified hybrid buffers to process the packets.

2. The method of claim 1, further comprising:
   in the hybrid buffer, writing a second type II completion line configured to identify a second payload buffer in which payloads of a second subset of the packets are stored.

3. The method of claim 1, wherein said completion descriptor comprises only said hybrid buffer identity.

4. The method of claim 1, wherein:
   said first type II completion line further comprises a checksum type field and a checksum start field; and
   said checksum type field and said checksum start field apply to every packet in the first subset of packets.

5. The method of claim 1, wherein said writing a per-packet type I completion line comprises packing said per-packet completion lines into the hybrid buffer.

6. The method of claim 5, further comprising:
   packing headers of the packets into the hybrid buffer.

7. The method of claim 1, wherein each said per-packet type I completion line comprises:
   a length of a header of the corresponding packet; and
   a length of a payload of the corresponding packet.

8. The method of claim 7, wherein each said per-packet type I completion line further comprises:
   an offset of the payload of the corresponding packet within a buffer in which the payload is stored; and
   a checksum of the corresponding packet.

9. The method of claim 1, wherein each packet in the set of packets is part of the same communication connection.

10. The method of claim 1, further comprising at the host computing device, after said signaling:
    reading said per-packet type I completion lines until encountering said type 0 completion lines; and
    using said per-packet type I completion lines to access headers and payloads of the corresponding packets.

11. A computer readable medium storing instructions that, when executed by a computer, cause the computer to perform a method of transferring packets from communication hardware to a host computing device, the method comprising:
    receiving a set of packets at a communication interface;
    in a hybrid buffer of a host computing device, writing a first type II completion line configured to identify a first payload buffer in which payloads of a first subset of the packets are stored, wherein the type II completion line includes an address or index of a payload buffer and other information common to the set of packets;
    for each packet in the set of packets, writing a corresponding per-packet type I completion line in the hybrid buffer, wherein the type I completion line includes information about a length of the packet, a length and a storage of a header for the packet, and other information useful for processing the packet;
    after writing said per-packet completion lines, writing a type 0 completion line, wherein a type 0 completion line indicates that no more packets are currently stored following the address or index indicated in the type II completion line; and
    signaling the host computing device that a set of packets is ready to be processed by configuring a single completion descriptor to identify the hybrid buffer in which the completion lines were stored; and
    at the host computing device, reading the single completion descriptor and accessing the identified hybrid buffers to process the packet.

12. A computer readable medium containing a packet description configured for describing multiple packets to a host computing device, the packet description comprising:

one or more headers of packets being transferred from communication hardware to the host computing device;

for each of the packets, a corresponding per-packet type I completion line stored in a hybrid buffer, wherein the type I completion line is configured to identify:

a length of a header of the corresponding packet;

a length of a payload of the corresponding packet; and information configured to identify a location of the payload;

a type 0 completion line, wherein a type 0 completion line is a null completion line used to indicate no more packets are currently stored; and a single completion descriptor configured to identify the hybrid buffer, thereby facilitating the efficient transfer of the packets.

13. The computer readable medium of claim 12, wherein each said per-packet type I completion line further comprises:

a checksum of the corresponding packet.

14. The computer readable medium of claim 12, wherein said packet description further comprises a payload type II completion line configured to identify a payload buffer in which payloads of the packets are stored.

15. The computer readable medium of claim 14, wherein said information in said per-packet type I completion line comprises an offset of the payload in the payload buffer.

16. The computer readable medium of claim 14, wherein:

said payload type II completion line further comprises a set of parameters applicable to each of the packets; and a first parameter in said set of parameters is configured to identify a checksum type.

17. The computer readable medium of claim 12, wherein the headers are stored in fixed-sized portions of the packet description.

18. A computing device, comprising:

a communication interface configured to transfer packets from a communication link to the computing device;

software for operating the communication interface;

payload memory buffers for receiving payloads of packets transferred from the communication interface;

hybrid buffers for receiving headers of the packets transferred from the communication interface and completion lines configured to facilitate processing of the packets by the software;

a single completion descriptor configured for the communication interface to use to signal the software that one or more packets have been transferred to the computing device;

wherein said completion lines in a hybrid buffer include:

a payload type II completion line configured to identify a first payload buffer in which payloads of one or more of the packets are stored, wherein the type II completion line includes an address or index of a payload buffer and other information common to the set of packets;

per-packet type I completion lines configured to identify locations of the packets' payloads in the first payload buffer and locations of the packets' headers in the first hybrid buffer, wherein the type I completion line includes information about a length of the packet, a length and a storage of a header for the packet, and other information useful for processing the packet; and a type 0 completion line, wherein a type 0 completion line indicates that no more packets are currently stored following the address or index indicated in the type II completion line.

19. The computing device of claim 18, wherein said completion lines further include:

a type 0 completion line, where in a type 0 completion line indicates that no more completion lines are stored in the hybrid buffer.

20. The computing device of claim 18, wherein a single completion descriptor used by the communication interface to signal the transfer of a first set of packets is configured by the communication interface to include only the identity of the hybrid buffer in which headers of the first set of packets are stored.

21. The computing device of claim 18, wherein:

said payload type II completion line further comprises a set of parameters common to the one or more packets; and the set of parameters comprises a checksum type.

22. The computing device of claim 18, wherein each said per-packet type I completion line corresponds to one packet and comprises:

a length of a header of the corresponding packet; and a length of the payload of the corresponding packet.

23. The computing device of claim 22, wherein each said per-packet type I completion line further comprises one or more of:

an offset of the payload in the first payload buffer; and an offset of the header in the first hybrid buffer.

24. The computing device of claim 22, wherein each said per-packet type I completion line further comprises a checksum of the corresponding packet.

\* \* \* \* \*